(12) United States Patent
Tyler

(10) Patent No.: US 7,152,326 B1
(45) Date of Patent: Dec. 26, 2006

(54) ROTARY BLADE HOLDING TOOL

(76) Inventor: Norman Tyler, 4623 Deer Park Rd., Owings Mills, MD (US) 21117

( * ) Notice: Subject to any disclaimer, the term of this patent is extended or adjusted under 35 U.S.C. 154(b) by 0 days.

(21) Appl. No.: 10/782,117

(22) Filed: Feb. 19, 2004

(51) Int. Cl.
*B26B 3/06* (2006.01)

(52) U.S. Cl. .................................. 30/151; 30/298.4

(58) Field of Classification Search ................ 30/151, 30/143, 286, 504, 539, 298.4; 206/349
See application file for complete search history.

(56) References Cited

U.S. PATENT DOCUMENTS

| | | | | |
|---|---|---|---|---|
| 1,258,481 A | * | 3/1918 | Shobar | 30/167 |
| 1,593,935 A | * | 7/1926 | Gerick et al. | 30/286 |
| 1,768,604 A | * | 7/1930 | Hurd | 30/151 |
| 1,957,065 A | * | 5/1934 | Hueber | 30/539 |
| 2,524,110 A | * | 10/1950 | Kucmmerling | 206/349 |
| 2,792,163 A | * | 5/1957 | Kidwell | 30/504 |
| 3,381,807 A | * | 5/1968 | De Vaughn | 206/363 |
| 4,306,600 A | * | 12/1981 | Lonsinger, Jr. | 150/154 |
| 4,736,544 A | | 4/1988 | Greenquist | |
| 4,753,377 A | * | 6/1988 | Poluhowich | 224/163 |
| 4,956,905 A | | 9/1990 | Davidson | |
| 5,291,996 A | * | 3/1994 | Linden | 206/349 |
| 6,138,363 A | * | 10/2000 | Kawashima | 30/151 |
| 6,272,724 B1 | | 8/2001 | Sterling et al. | |
| 6,434,838 B1 | * | 8/2002 | Mai | 30/504 |
| 2002/0133952 A1 | * | 9/2002 | Kenny | 30/151 |
| 2004/0221457 A1 | * | 11/2004 | Shen | 30/151 |

* cited by examiner

*Primary Examiner*—Hwei-Siu Payer

(57) ABSTRACT

A rotary blade holding tool for facilitating safe and firm grasping of a rotary blade during removal includes an elongated bowed sheath having an end opening for receiving a rotary blade therein such that the sheath surrounds an end of the rotary blade.

15 Claims, 3 Drawing Sheets

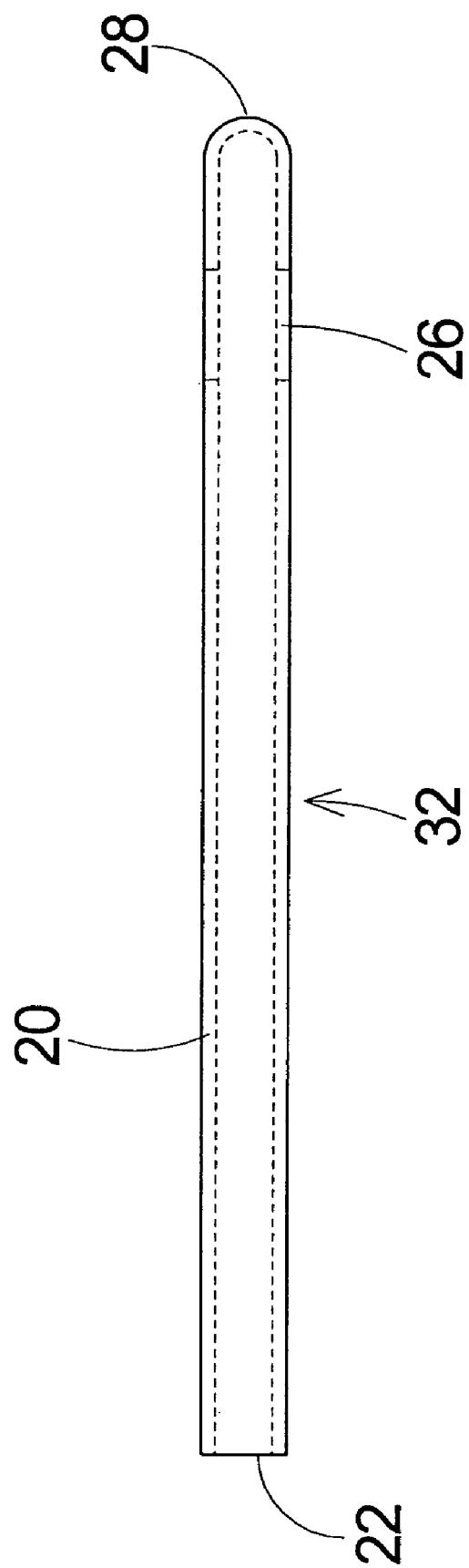

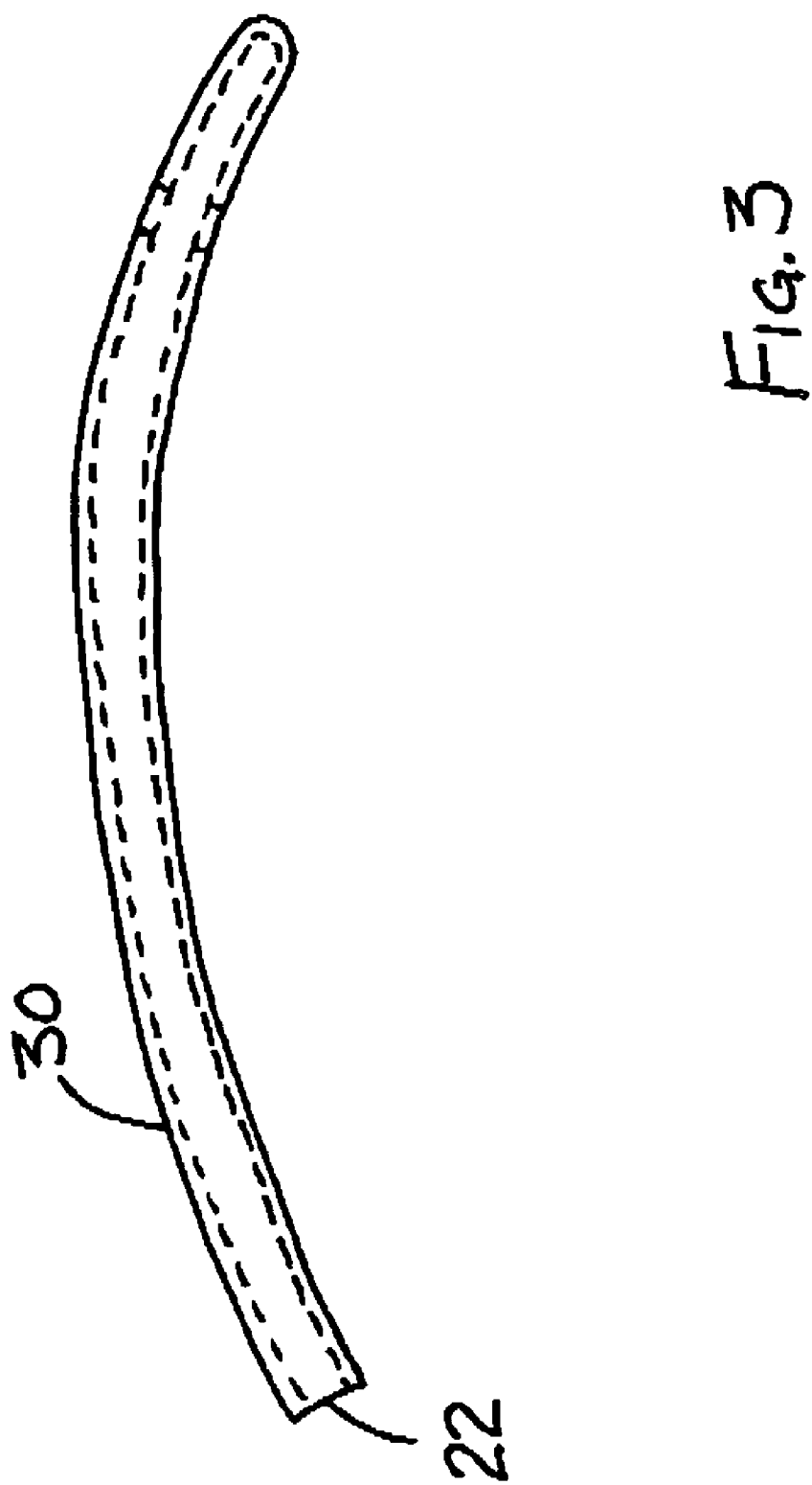

ROTARY BLADE HOLDING TOOL

BACKGROUND OF THE INVENTION

1. Field of the Invention

The present invention relates to hand tools and more particularly pertains to a new rotary blade holding tool for facilitating safe and firm-grasping of a rotary blade during installation, removal, or repair.

2. Description of the Prior Art

The use of hand tools is known in the prior art. U.S. Pat. No. 4,956,905 issued to Davidson on Sep. 18, 1990 describes a tool having a horizontal web and spaced flanges to receive a bolt for encircling a rotary blade. U.S. Pat. No. 4,736,544 issued to Greenquist on Apr. 12, 1988 discloses a blade holder for sharpening lawnmower blades incorporates a slotted face bar pivotally mounted to a forward portion of a horizontal base plate resting on a bench top. U.S. Pat. No. 6,272,724 issued to Sterling et al. on Aug. 14, 2001 provides a blade removing tool including a central support assembly forming a guide adapted to be positioned over a bolt holding a rotary lawn mower blade in position while allowing a socket wrench access to the bolt.

While these devices fulfill their respective, particular objectives and requirements, the need remains for a relatively simple and efficient device to assist in grasping a rotary blade safely and securely.

SUMMARY OF THE INVENTION

The present invention generally comprises an elongated bowed sheath having an end opening for receiving a rotary blade therein such that the sheath surrounds an end of the rotary blade.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is a front view of the present invention.

FIG. 3 is a front view of a variation of the present invention.

DESCRIPTION OF THE PREFERRED EMBODIMENT

Figure 1:
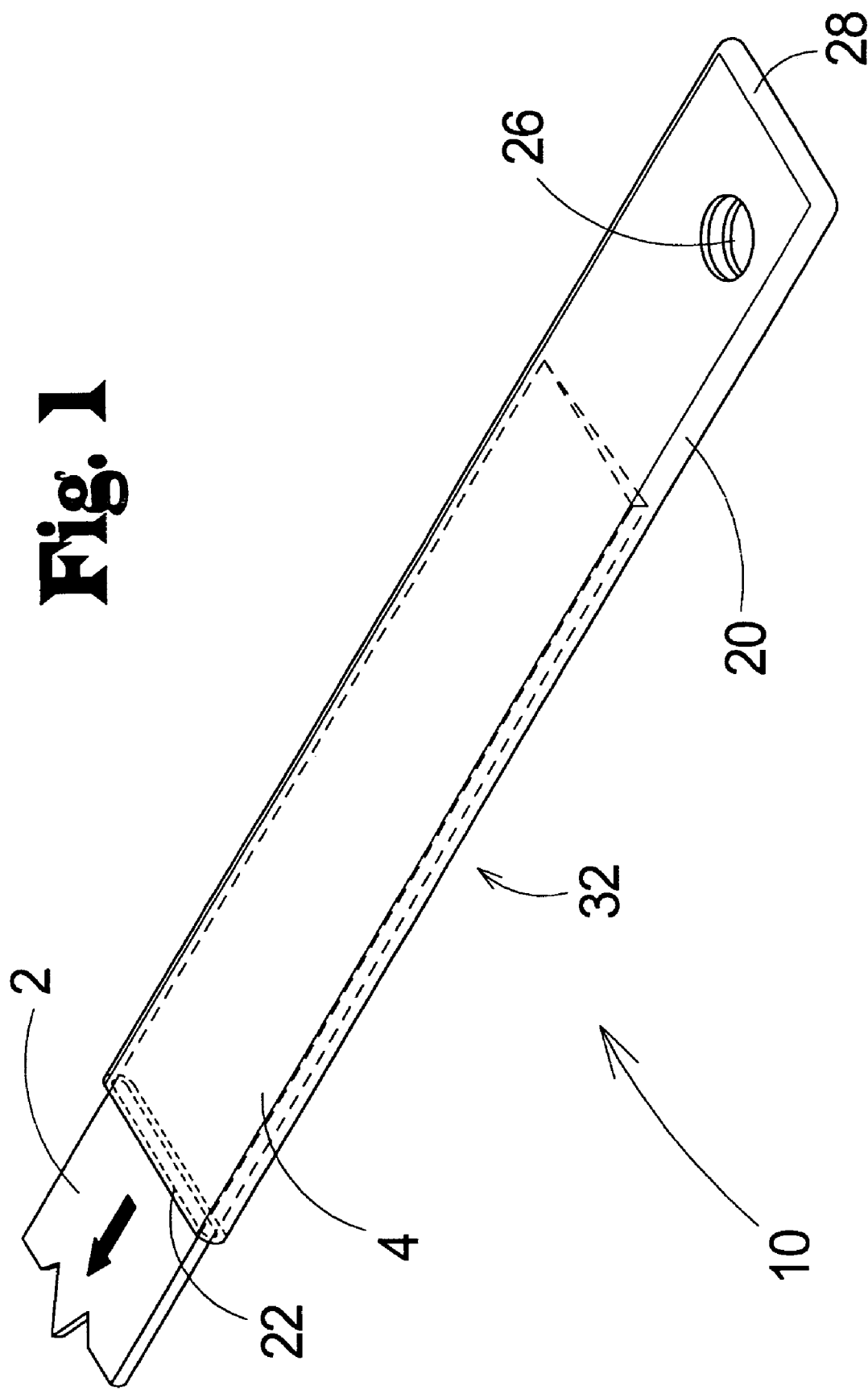
FIG. 1 is a perspective view of a new rotary blade holding tool according to the present invention.

With reference now to the drawings, and in particular to FIGS. 1 through 3 thereof, a new rotary blade holding tool embodying the principles and concepts of the present invention and generally designated by the reference numeral 10 will be described.

As best illustrated in FIGS. 1 and 2, the rotary blade holding tool 10 for facilitating holding a rotary blade 2 during manipulation of the rotary blade 2 generally comprises an elongated sheath 20 having an opening 22 extending into the elongated sheath 20 for snugly receiving an end 4 of the rotary blade 2. Thus, the elongated sheath 20 surrounds and covers the end 4 of the rotary blade 2. The elongated sheath 20 is graspable by a user such that the user can prevent rotation of the rotary blade 2. The elongated sheath 20 preferably has an oblong cross-sectional shape for facilitating comfortable grasping of the elongated sheath 20. The sheath 20 is constructed of metal or other material sufficient to shield and cushion a user's hand grasping the elongated sheath directly over the rotary blade 2. The elongated sheath further has sufficient stiffness to permit control of the rotary blade when grasping a distal end portion of the sheath extending from the distal end of the rotary blade.

The elongated sheath 20 is structured to include an aperture 26 extending completely through the elongated sheath 20. The aperture 26 is positioned proximate an end 28 of the elongated sheath 20 opposite the opening 22.

In one embodiment of the invention, the elongated sheath 30 is bowed along a longitudinal axis of the elongated sheath 30 (see FIG. 3). It is intended that the definition of bowing include both smooth arcing of the sheath as well as angling by a distinct bending point. Thus, the elongated sheath 30 securely engages the end 4 of the rotary blade 2 as it is inserted into the opening 22.

Preferred dimensions include the opening 22 having a width of about 1 inch for receiving the end 4 of the rotary blade 2. The elongated sheath 20 has a length of about fifteen and one half inches and a width of about three and one half inches. To provide the bowing, a medial portion 32 of the elongated sheath 20 is offset from ends of the elongated sheath 20 by about one sixteenth inches. The aperture 26 has a diameter of about one half inches.

In use, the end of the rotary blade is inserted into the opening until the bowing of the sheath provides snug engagement of the blade. The blade may then be controlled by grasping of the sheath. The aperture may be used to enhance the grip of the user on the sheath but is also provided to facilitate storage of the sheath by hanging from a bracket or similar device inserted through the aperture.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A rotary blade holding tool for facilitating holding a rotary blade during manipulation of the rotary blade, said rotary blade holding tool comprising:

an elongated sheath having an opening extending into said elongated sheath for snugly receiving an end of the rotary blade whereby said elongated sheath surrounds and covers the end of the rotary blade, said elongated sheath being graspable by a user such that the user prevents rotation of the rotary blade;

wherein said elongated sheath is bowed along a longitudinal axis of said elongated sheath whereby said elongated sheath securely engages the end of the rotary blade as it is inserted into said opening; and wherein said bowed character of said sheath positions a medial portion of said elongated sheath in an offset relationship to end portions of said elongated sheath;

wherein said elongated sheath is structured to include an aperture extending completely through said elongated sheath, said aperture being positioned proximate an end of said elongated sheath opposite said opening for enhancing the grip of a user and for facilitating storage of the sheath by hanging from a bracket or similar device inserted through the aperture.

2. The rotary blade holding tool of claim 1 wherein said opening has a width of about 1 inch for receiving the end of the rotary blade.

3. The rotary blade holding tool of claim 1 wherein said elongated sheath has a length of about fifteen and one half inches.

4. The rotary blade holding tool of claim 1 wherein said elongated sheath has an oblong cross-sectional shape for facilitating comfortable grasping of said elongated sheath.

5. The rotary blade holding tool of claim 1 wherein said elongated sheath has a width of about three and one half inches.

6. The rotary blade holding tool of claim 1 wherein said aperture has a diameter of about one half inches.

7. The rotary blade holding tool of claim 1 wherein said opening has a width of about 1 inch for receiving the end of the rotary blade;

wherein said elongated sheath has a length of about fifteen and one half inches;

wherein said elongated sheath has an oblong cross-sectional shape for facilitating comfortable grasping of said elongated sheath;

wherein said elongated sheath has a width of about three and one half inches; and wherein said aperture has a diameter of about one half inches.

8. A rotary blade holding tool for facilitating holding a rotary blade during manipulation of the rotary blade, said rotary blade holding tool comprising:

an elongated sheath having opposite ends and an opening extending into one of the ends of said elongated sheath for snugly receiving an end of the rotary blade whereby said elongated sheath surrounds and covers the end of the rotary blade, said elongated sheath being graspable by a user such that the user prevents rotation of the rotary blade;

wherein said elongated sheath is bowed along a longitudinal axis of said elongated sheath between said ends whereby said elongated sheath securely engages the end of the rotary blade as it is inserted into said openings;

wherein said elongated sheath is structured to include an aperture extending completely through said elongated sheath, said aperture being positioned proximate an end of said elongated sheath opposite said opening for enhancing the grip of a user and for facilitating storage of the sheath by hanging from a bracket or similar device inserted through the aperture.

9. The rotary blade holding tool of claim 8 wherein said opening has a width of about 1 inch for receiving the end of the rotary blade.

10. The rotary blade holding tool of claim 8 wherein said elongated sheath has a length of about fifteen and one half inches.

11. The rotary blade holding tool of claim 8 wherein said elongated sheath has an oblong cross-sectional shape for facilitating comfortable grasping of said elongated sheath.

12. The rotary blade holding tool of claim 8 wherein said elongated sheath has a width of about three and one half inches.

13. The rotary blade holding tool of claim 8 wherein said bowed character of said sheath positions a medial portion of said elongated sheath in an offset relationship to end portions of said elongated sheath.

14. The rotary blade holding tool of claim 8 wherein said aperture has a diameter of about one half inches.

15. The rotary blade holding tool of claim 8 wherein said opening has a width of about 1 inch for receiving the end of the rotary blade;

wherein said elongated sheath has a length of about fifteen and one half inches;

wherein said elongated sheath has an oblong cross-sectional shape for facilitating comfortable grasping of said elongated sheath;

wherein said elongated sheath has a width of about three and one half inches;

wherein said bowed character of said sheath positions a medial portion of said elongated sheath in an offset relationship to end portions of said elongated sheath; and wherein said aperture has a diameter of about one half inches.

* * * * *